US012725867B2

(12) United States Patent
Brecher et al.

(10) Patent No.: US 12,725,867 B2
(45) Date of Patent: Sep. 1, 2026

(54) BATTERY ARRANGEMENT AND METHOD OF ASSEMBLING THE SAME

(71) Applicant: SONOVA AG, Staefa (CH)

(72) Inventors: Dennis Brecher, Uetikon am See (CH); Hans Wunderli, Zürich (CH)

(73) Assignee: Sonova AG, Staefa (CH)

( * ) Notice: Subject to any disclaimer, the term of this patent is extended or adjusted under 35 U.S.C. 154(b) by 742 days.

(21) Appl. No.: 17/942,823

(22) Filed: Sep. 12, 2022

(65) Prior Publication Data

US 2023/0107419 A1 Apr. 6, 2023

(30) Foreign Application Priority Data

Oct. 6, 2021 (EP) .................................... 21201212

(51) Int. Cl.

| | |
|---|---|
| ***H01M 50/24*** | (2021.01) |
| ***H01M 50/202*** | (2021.01) |
| ***H01M 50/247*** | (2021.01) |
| ***H01M 50/271*** | (2021.01) |
| ***H01M 50/284*** | (2021.01) |
| ***H01M 50/298*** | (2021.01) |
| ***H04R 25/00*** | (2006.01) |
| *B23K 26/21* | (2014.01) |
| *B23K 101/36* | (2006.01) |

(52) U.S. Cl.

CPC ......... *H01M 50/24* (2021.01); *H01M 50/202* (2021.01); *H01M 50/247* (2021.01); *H01M 50/271* (2021.01); *H01M 50/284* (2021.01); *H01M 50/298* (2021.01); *H04R 25/602* (2013.01); *B23K 26/21* (2015.10); *B23K 2101/36* (2018.08); *H01M 2220/30* (2013.01); *H04R 2225/31* (2013.01)

(58) Field of Classification Search

CPC .. H01M 50/24; H01M 50/247; H01M 50/202; H01M 50/298; H01M 50/284; H01M 50/271; H01M 2220/30

See application file for complete search history.

(56) References Cited

U.S. PATENT DOCUMENTS

| | | | | |
|---|---|---|---|---|
| 2002/0198437 A1* | 12/2002 | Juneau | ................. | C07D 493/10 264/222 |
| 2004/0081328 A1* | 4/2004 | Leedom | ............... | H04R 25/602 381/323 |
| 2021/0100508 A1* | 4/2021 | Vos | ...................... | H04R 25/554 |

OTHER PUBLICATIONS

"Extended European Search Report received in EP Application No. 21201212.4 on May 4, 2022".

* cited by examiner

*Primary Examiner* — Jane J Rhee
(74) *Attorney, Agent, or Firm* — ALG Intellectual Property, LLC

(57) ABSTRACT

A battery arrangement for a hearing device may include a case for a battery, wherein the case comprises a case bottom and a case top configured as a lid for the case bottom, wherein a main chamber is defined within the case for receiving the battery, wherein a pre-chamber is defined within the case adjacent the main chamber, wherein one of a wiring and printed circuit board is electrically connected to the battery and led through the pre-chamber out of the case, wherein the pre-chamber is filled with a filling material.

14 Claims, 1 Drawing Sheet

BATTERY ARRANGEMENT AND METHOD OF ASSEMBLING THE SAME

RELATED APPLICATIONS

The present application claims priority to EP Patent Application No. EP 21201212, filed Oct. 6, 2021, the contents of which are hereby incorporated by reference in their entirety.

BACKGROUND INFORMATION

A hearing device is typically provided with a battery, in particular an accumulator. In order to protect the accumulator from any external influence, e.g. sweat, cerumen and moisture, it is stored in a case which may be multi part and which should be sealed. This case may be sealed in a number of process steps, e.g, the accumulator may be glued into a bottom part of the case, the case parts are laser welded, the case is filled with a socketing, a glue is applied in a location where a wiring or printed circuit board connecting the battery is led through. This requires time and space and involves some risky interfaces. Moreover, servicing the battery is difficult this way.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Corresponding parts are marked with the same reference symbols in all figures.

DETAILED DESCRIPTION

Figures 1, 2, 3:
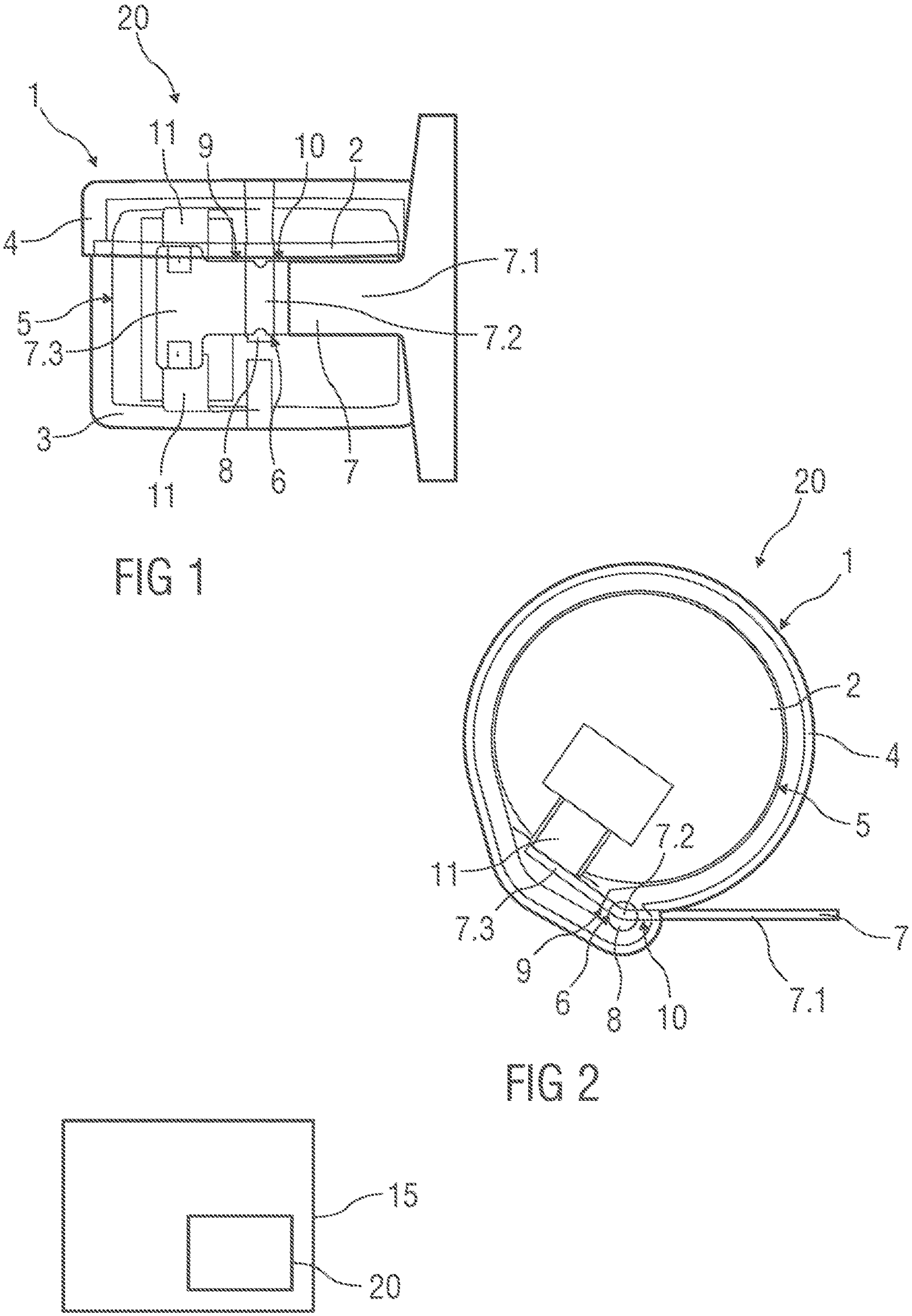
FIG. 1 is a schematic view of a battery arrangement.
FIG. 2 is another schematic view of a battery arrangement.
FIG. 3 is a schematic view of a hearing device with a battery arrangement.

Described herein are a battery arrangement, in particular for a hearing device and to a method for assembling a battery arrangement.

It is a feature of the embodiments described herein to provide an improved battery arrangement and an improved method for assembling a battery arrangement.

In some embodiments, a battery arrangement for a hearing device comprises a case for a battery, wherein the case comprises a case bottom and a case top configured as a lid for the case bottom, wherein a main chamber is defined within the case for receiving the battery, wherein a pre-chamber is defined within the case adjacent the main chamber, e.g. adjacent a periphery thereof, wherein a wiring or printed circuit board is electrically connected to the battery (which may be received within the main chamber) and led through the pre-chamber out of the case, wherein the pre-chamber is filled with a filling material, e.g. glue.

The case, sealed by the filling material protects the accumulator from any external influence, e.g. sweat, cerumen and moisture. As hearing devices are small and compact devices, the battery arrangement is typically small and compact as well in order to fit into a hearing device.

The case may be made of a nonconductive material, e.g. a non-metallic material, in particular plastic.

In an exemplary embodiment, the pre-chamber has a first slot toward the main chamber and a second slot leading out of the case for leading the wiring or printed circuit board through. The slots may be dimensioned just wide enough to allow the wiring or printed circuit board to pass through to avoid spilling of the filling material.

In an exemplary embodiment, the first and second slots extend to a top side of the case bottom, i.e. the side facing the case top when the case is assembled, thus allowing to insert the printed circuit board or wiring which is already electrically connected to the accumulator into the pre-chamber while the accumulator is being inserted into the main chamber at the same time.

In an exemplary embodiment, the first slot is oriented in a tangential direction with regard to the main chamber.

In an exemplary embodiment, the pre-chamber extends to at least one surface of the case in an assembled state thereof thus allowing filling in the filling material when the case top is assembled to the case bottom.

In an exemplary embodiment, the main chamber and/or the pre-chamber are/is cylindrical with an essentially circular cross section.

In an exemplary embodiment, the pre-chamber is arranged adjacent a periphery of the cylindrical main chamber.

In an exemplary embodiment, an axis of the cylindrical pre-chamber is in parallel with an axis of the cylindrical main chamber.

In an exemplary embodiment, the printed circuit board is a flexible printed circuit board.

In an exemplary embodiment, the battery is an accumulator.

According to an aspect described herein, a hearing device is provided, comprising a battery arrangement as described above. Likewise, the battery arrangement may be used for any other type of device aside from hearing devices.

According to another aspect described herein, a method for assembling a battery arrangement, in particular as described above, is provided, comprising: providing a battery, a wiring or printed circuit board electrically connected to the battery, and a case for the battery, wherein the case comprises a case bottom and a case top configured as a lid for the case bottom, wherein a main chamber is defined within the case for receiving the battery, wherein a pre-chamber is defined within the case adjacent the main chamber, inserting the printed circuit board or wiring electrically connected to the battery into the pre-chamber while at the same time inserting the battery into the main chamber, placing the case top on the case bottom and fixing it thereto, and filling the pre-chamber with a filling material.

In an exemplary embodiment, the pre-chamber is filled with the filling material prior to or after placing the case top on the case bottom and fixing it thereto.

In an exemplary embodiment, the filling involves application of pressure, e.g. by injection molding.

In an exemplary embodiment, he case top is fixed to the case bottom by laser welding.

The solution described herein allows for reducing process time and the number of process steps for assembling and sealing the battery arrangement. The method may be performed automatically and is applicable for any form factor. Moreover, space requirements for the battery arrangement may be reduced thus allowing for leaner hearing devices. Access to the parts to be filled with the filling material is facilitated as opposed to prior art solutions. The accumulator is protected by the pre-chamber. The solution facilitates changing the battery without destroying the whole case. This makes it possible to largely reuse the arrangement.

Further scope of applicability of the embodiments described herein will become apparent from the detailed description given hereinafter. However, it should be understood that the detailed description and specific examples, while indicating example embodiments, are given by way of illustration only, since various changes and modifications within the spirit and scope of the embodiments described herein will become apparent to those skilled in the art from this detailed description.

FIGS. 1 and 2 are schematic views of a battery arrangement 20, comprising a case 1 for a battery 2, in particular an accumulator 2, which may be applied in a hearing device 15. FIG. 3 is a schematic view of a hearing device 15 with a battery arrangement 20.

The case 1 comprises a case bottom 3 which is basically cup-shaped and a case top 4 configured as a lid for the case bottom 3. Within the case 1, a main chamber 5 is defined for receiving the accumulator 2. The main chamber 5 may be cylindrical with an essentially circular cross section to retain an accumulator 2 having a complementary shape. Moreover, adjacent the main chamber 5, a pre-chamber 6 is defined within the case 1. In an exemplary embodiment, the pre-chamber 6 is arranged adjacent a periphery of the cylindrical main chamber 5. In an exemplary embodiment, the pre-chamber 6 may also be cylindrical with an essentially circular cross section. An axis of the cylindrical pre-chamber 6 may be in parallel with an axis of the cylindrical main chamber 5.

A wiring or printed circuit board 7 is electrically connected to the accumulator 2, e.g. at a periphery thereof, and led through the pre-chamber 6 out of the case 1. For this purpose, the pre-chamber 6 may have a first slot 9 toward the main chamber 5 and a second slot 10 leading out of the case 1. The first slot 9 toward the main chamber 5 may be oriented in a tangential direction with regard to the cylindrical main chamber 5.

The printed circuit board 7 may be a flexible printed circuit board 7. The printed circuit board 7 may have a part 7.1 located outside the case 1, a part 7.2 located in the pre-chamber 6 and a part 7.3 located in the main chamber 5 to which the accumulator 2 is connected through battery contacts 11.

The slots 9, 10 of the pre-chamber 6 may extend to a top side of the case bottom 3, i.e. the side facing the case top 4 when the case 1 is assembled, thus allowing to insert the printed circuit board 7 or wiring which is already electrically connected to the accumulator 2 into the pre-chamber 6 while the accumulator 2 is being inserted into the main chamber 5 at the same time. While the main chamber 5 is enclosed by the case bottom 3 and the case top 4, the pre-chamber 6 may be configured to remain open on at least one end of its cylindrical shape even if the case bottom 3 and the case top 4 are assembled to one another to allow for filling in a filling material such as a glue 8 after the case bottom 3 and the case top 4 have been assembled to one another. For this purpose, the pre-chamber 6 may extend through the case top 4. In the illustrated embodiment, the pre-chamber 6 is closed toward a bottom side of the case bottom 3.

In another embodiment, the pre-chamber 6 may extend through the case bottom 3. In this case, the pre-chamber 6 does not necessarily have to extend into or through the case top 4.

In order to assemble the battery arrangement 20, the printed circuit board 7 or wiring which is already electrically connected to the accumulator 2 is inserted into the pre-chamber 6 and into the slots 9, 10 while the accumulator 2 is being inserted into the main chamber 5 at the same time. The case top 4 is placed on the case bottom 3 and fixed thereto, e.g. by laser welding. The pre-chamber 6 is filled by a filling material such as glue 8. The filling may involve application of pressure for better definition of the process. For example, the filling may comprise injection molding.

In another embodiment, in order to assemble the battery arrangement 20, the printed circuit board 7 or wiring which is already electrically connected to the accumulator 2 is inserted into the pre-chamber 6 and into the slots 9, 10 while the accumulator 2 is being inserted into the main chamber 5 at the same time. The pre-chamber 6 is then filled by a filling material such as glue 8. The filling may involve application of pressure for better definition of the process. For example, the filling may comprise injection molding. Subsequently, the case top 4 is placed on the case bottom 3 and fixed thereto, e.g. by laser welding. In this embodiment, the pre-chamber 6 does not necessarily have to extend into or through the lid or to any surface of the fully assembled battery arrangement 20 for that matter.

The battery arrangement 20 may also be used for any other type of device aside from hearing devices 15.

LIST OF REFERENCES

- 1 case
- 2 battery, accumulator
- 3 case bottom
- 4 case top
- 5 main chamber
- 6 pre-chamber
- 7 printed circuit board
- 7.1 to 7.3 part
- 8 glue
- 9 slot, first slot
- 10 slot, second slot
- 11 battery contact
- 15 hearing device
- 20 battery arrangement

What is claimed is:

1. A battery arrangement for a hearing device, comprising a case for an accumulator, wherein the case comprises a case bottom and a case top configured as a lid for the case bottom, wherein a main chamber is defined within the case for receiving the accumulator, wherein a pre-chamber is defined within the case adjacent the main chamber, wherein one of a wiring and printed circuit board is electrically connected to the accumulator and led through the pre-chamber out of the case, wherein the pre-chamber is filled with a glue in a location where the printed circuit board is led through the pre-chamber out of the case, wherein the glue is a different material than the case.

2. The battery arrangement according to claim 1, wherein the pre-chamber has a first slot toward the main chamber and a second slot leading out of the case for leading the one of the wiring and the printed circuit board through.

3. The battery arrangement according to claim 2, wherein the first and second slots extend to a top side of the case bottom.

4. The battery arrangement according to claim 2, wherein the first slot is oriented in a tangential direction with regard to the main chamber.

5. The battery arrangement according to claim 1, wherein the pre-chamber extends to at least one surface of the case in an assembled state thereof.

6. The battery arrangement according to claim 1, wherein at least one of the main chamber and the pre-chamber is cylindrical with an essentially circular cross section.

7. The battery arrangement according to claim 6, wherein the pre-chamber is arranged adjacent a periphery of the cylindrical main chamber.

8. The battery arrangement according to claim 6, wherein an axis of the cylindrical pre-chamber is in parallel with an axis of the cylindrical main chamber.

9. The battery arrangement according to claim 1, wherein the printed circuit board is a flexible printed circuit board.

10. A hearing device, comprising a battery arrangement according to claim 1.

11. A method for assembling a battery arrangement the method comprising:

providing an accumulator, one of a wiring and a printed circuit board electrically connected to the accumulator, and a case for the accumulator, wherein the case comprises a case bottom and a case top configured as a lid for the case bottom, wherein a main chamber is defined within the case for receiving the accumulator, wherein a pre-chamber is defined within the case adjacent the main chamber, inserting the one of the printed circuit board and the wiring electrically connected to the accumulator into the pre-chamber while at the same time inserting the accumulator into the main chamber, placing the case top on the case bottom and fixing it thereto, filling the pre-chamber with a glue in a location where the printed circuit board is led through the pre-chamber out of the case, wherein the glue is a different material than the case.

12. The method of claim 11, wherein the pre-chamber is filled with the filling material one of prior to and after placing the case top on the case bottom and fixing it thereto.

13. The method according to claim 11, wherein the filling involves application of pressure.

14. The method according to claim 11, wherein the case top is fixed to the case bottom by laser welding.

* * * * *